G. H. STEWART.
CAN SOLDERING MACHINE.
APPLICATION FILED JULY 15, 1907.
898,937.
Patented Sept. 15, 1908.
2 SHEETS—SHEET 1.
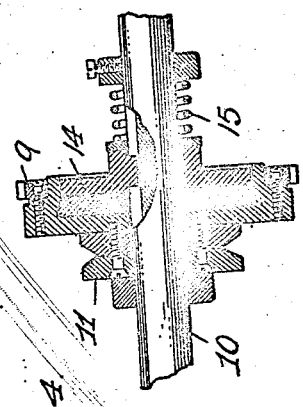
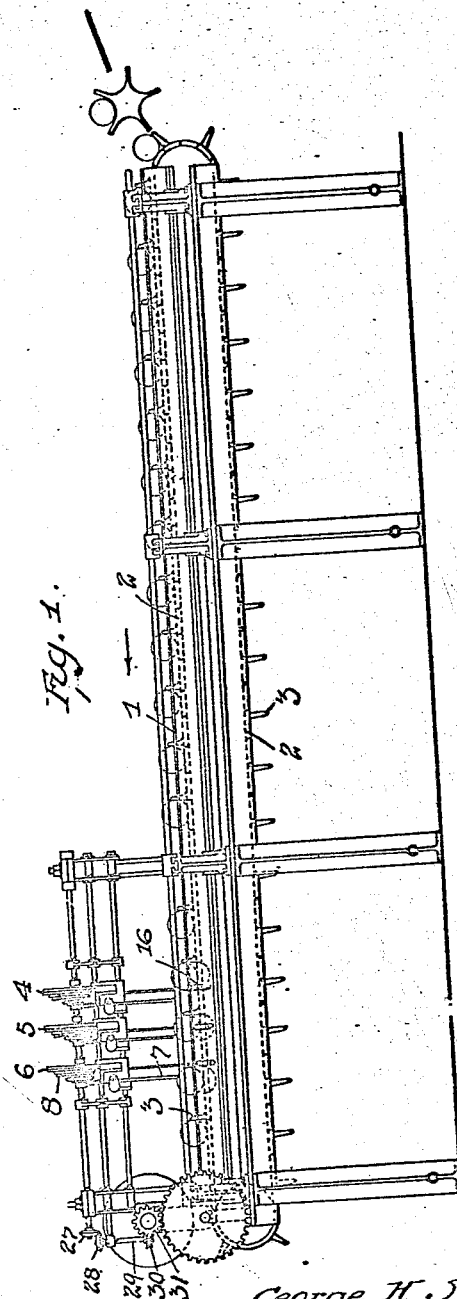
Attest:
Edw. L. Folson.
Edward N. Santos.
Inventor.
George H. Stewart,
by Spear, Middleton, Donaldson & Spear
Att'ys.

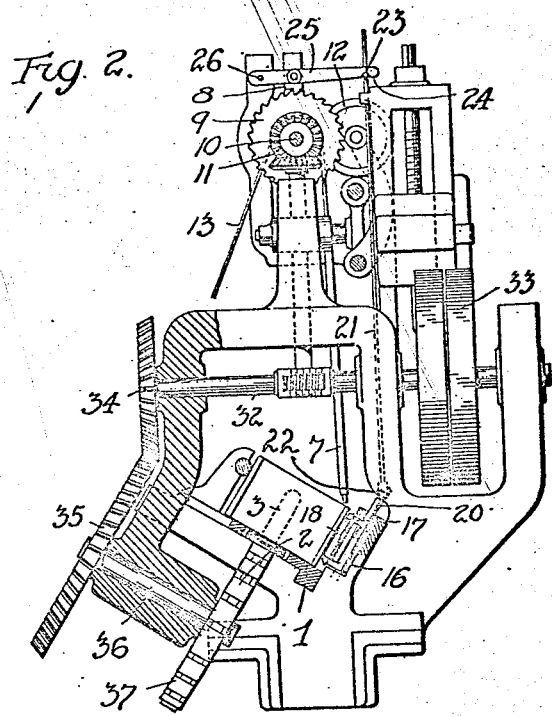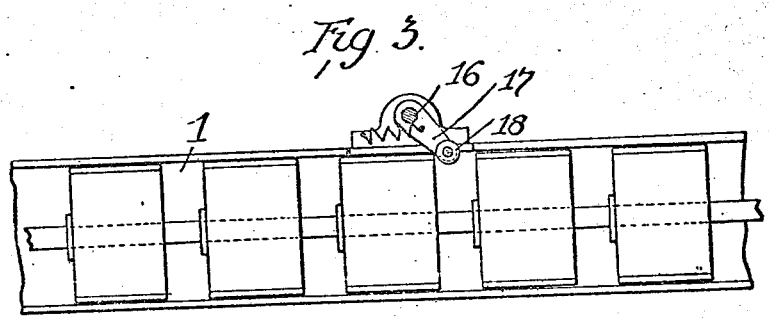

UNITED STATES PATENT OFFICE.

GEORGE H. STEWART, OF LOS ANGELES, CALIFORNIA.

CAN-SOLDERING MACHINE.

No. 898,937.

Specification of Letters Patent.

Patented Sept. 15, 1908.

Application filed July 15, 1907. Serial No. 383,766.

*To all whom it may concern:*

Be it known that I, GEORGE H. STEWART, a citizen of the United States, residing at Los Angeles, California, have invented certain new and useful Improvements in Can-Soldering Machines, of which the following is a specification.

My invention relates to machines for soldering cans and particularly to machines for soldering the end seams.

The invention concerns the class of can soldering machines disclosed in Letters Patent of the United States granted to George H. Stewart, July 11, 1905, #794691 and 794692, the former being adapted to solder side seams and the latter to solder end seams.

My present invention is designed to provide a machine by which definite and exact quantities of solder may be fed to the end seams of the cans so that the feeding of the solder will be regulated by the diameter of the can and bear a definite relation to the circumference of the seam to be soldered.

In Patent 794691 above noted, are shown means for feeding definite and exact lengths of solder to the side seam of the can, the solder feeding action being controlled by the can itself so that cans of different lengths may be fed through the machine, and the feeding of the solder will be automatically regulated as to amount in accordance with the length of the side seam. I design to accomplish the same result in connection with the end seams.

The invention consists in the features and combination and arrangement of parts hereinafter described and particularly pointed out in the claims.

In the accompanying drawings, Figure 1 is a side elevation of the machine embodying my improvements. Fig. 2 is a sectional view looking from the right of Fig. 1. Fig. 3 is a plan view. Fig. 4 is a view of a detail.

In these drawings 1 represents a runway along which the cans travel in inclined position as shown in Fig. 2, being caused to traverse said runway by a carrier chain 2 having fingers 3 thereon to engage the sides of the can and roll the same from end to end of the runway. The cans travel in the direction of the arrow Fig. 1, and are subjected to the action of heating flames before arriving at the soldering units 4, 5, 6, where the solder is fed on to the can. These soldering units are substantially the same as those disclosed in an application of George H. Stewart, filed May 28, 1907, Serial Number 376175 and need no particular description herein excepting to point out that the solder is fed down through the tube 7 directly to the end seam as shown in Fig. 2, and that the feed of solder is controlled by a pawl 8, arranged to engage and disengage a toothed wheel 9 on a constantly operating shaft 10, which carries the solder feed wheel 11 between which and a presser wheel 12 the solder wire 13 passes from any suitable source. There is a friction driving connection between the toothed wheel and a disk 14 which is splined to the shaft 10, and which is pressed into contact with the toothed wheel by means of a spring 15.

The toothed wheel is connected rigidly with the solder feed wheel. So long as the pawl 8 engages the toothed wheel the friction drive will have no effect thereupon but as soon as the pawl is lifted the friction drive will rotate the toothed wheel and consequently the solder wire feed wheel will be rotated to feed the solder. The pawl is in turn controlled by the passage of the cans, and I aim to provide means whereby the control of the pawl and the time it is out of action with the toothed wheel will be in accordance with the diameter of the can which is to be soldered so that the feeding action of the feed wheel on the solder will correspond in length of time and in quantity of solder fed to the diameter of the can, and consequently to the circumference of the can and length of the seam. For this purpose I journal in suitable bearings adjacent the runway, a rocking member 16 having arms 17 carrying a roller 18 which is arranged in inclined position and in the path of the end of the can so that as the cans come along this roller will be borne upon and pressed aside and will then contact with the end or head of the can which will sweep by the roller so that the roller will traverse the can diametrically of its head. The moving aside of the roller 18 will, of course, turn the rocking member, and through an extension 20 of the pivot or shaft of said rocking member a rocking shaft or bar 21 will be turned, said rocking shaft having a universal joint connection at 22 with the said extension 20 and turning in any suitable bearings in the frame. The upper end of this rocking shaft or bar carries a pin or finger 23 which engages a notch 24 on the under side of the arm 25, which is pivoted at 26 to the machine frame and carries the pawl 8 before mentioned. The turning movement of the rock shaft 21 will cause the finger 23 to bear upon the inclined side of the notch 24 so as to have a cam-like action thereon and lift the said arm 25 to withdraw the pawl 8 from the toothed wheel 9. The parts will be held in this position and consequently the feed of the solder will go on continuously until the can has passed the rocking device, or in other words, until the roller 18 has moved across the head of the can on the line of its diameter from its forward edge to its rear edge and has dropped off from the edge of the head, a suitable spring being provided to give this action to the rocker device as soon as the edge of the can leaves the roller. As a result of this, the extension 20 of the rocker device will, through the universal joint 22 turn the bar or shaft 21 back to its normal position and allow the lever 25 to move downwardly, thus engaging the pawl 8 with the toothed wheel and arresting the feed of the solder. In this way I am enabled to feed definite and exact amounts of solder to correspond with the circumference of the seam at the head, and cans varying in size may thus be run through the machine without requiring any special adjustment of the solder feeding device, the arrangement shown being adapted to feed solder to different sizes of cans in succession and in amounts corresponding to the length of the seam being soldered.

I do not limit myself to the means for driving the various parts, but I have shown, for example, that the shaft 10 for driving the solder wheels of the soldering units may be driven through bevel gearing 27, 28, from a shaft 29 journaled in suitable bearings and having a worm wheel 30 operated from a worm 31 on a shaft 32 which may be driven through a pulley 33. The chain carrier for the cans may be driven from the shaft 32 through the bevel wheels 34, 35, the latter being on a shaft 36 bearing in the frame and carrying a sprocket wheel 37 to engage the links of the carrier chain.

I claim:—

1. In a can end-soldering machine, the combination of means for moving the cans past the solder point, means for heating the cans at and adjacent to the surfaces to be soldered, means for feeding solder to the end seam and controlling means for the solder feeding means, said controlling means engaging the head of the can and having traversing movement proportional to the diameter of the same, the solder being fed only during the said traversing movement, substantially as described.

2. In a can end-soldering machine, the combination of means for moving the cans past the solder point, means for heating the cans, means for feeding solder to the end seam, and controlling means for the solder feeding means, said controlling means engaging the face of the head of the can and having relative traversing movement across the same, the solder being fed only during the said traversing movement, substantially as described.

3. In combination in a can end-soldering machine, means for supporting and moving a can past the solder point said means receiving cans of different diameters, means for heating the can prior to reaching the solder point, and mechanism for feeding the solder directly to the end seam of the can, said mechanism being controlled in its feeding action by the can to an extent corresponding to and varied automatically in accordance with the length of the end seam of the can, substantially as described.

4. In combination in a can end-soldering machine, means for moving a can past the solder point, means for heating the can, solder feeding devices, and a pivoted member arranged to bear on the can head, said pivoted member being moved aside by contact with the can and thereby controlling the feed of the solder to the end seam, substantially as described.

In testimony whereof, I affix my signature in presence of two witnesses.

GEO. H. STEWART.

Witnesses:
E. W. RENKIN,
E. G. HOWELL.